(12) United States Patent
Bentley et al.

(10) Patent No.: US 8,312,774 B2
(45) Date of Patent: Nov. 20, 2012

(54) FLOW-THROUGH PRESSURE SENSOR APPARATUS

(75) Inventors: Ian Bentley, New Ipswich, NH (US); Jim Cook, Freeport, IL (US); Lamar Floyd Ricks, Lewis Center, OH (US); Alistair David Bradley, Dublin, OH (US); Richard Wade, Worthington, OH (US)

(73) Assignee: Honeywell International Inc., Morristown, NJ (US)

( * ) Notice: Subject to any disclaimer, the term of this patent is extended or adjusted under 35 U.S.C. 154(b) by 879 days.

(21) Appl. No.: 12/389,091

(22) Filed: Feb. 19, 2009

(65) Prior Publication Data

US 2010/0206046 A1 Aug. 19, 2010

(51) Int. Cl.
*G01L 7/00* (2006.01)
(52) U.S. Cl. ............................................ 73/700; 73/714
(58) Field of Classification Search .................. None
See application file for complete search history.

(56) References Cited

U.S. PATENT DOCUMENTS

| | | | | |
|---|---|---|---|---|
| 3,934,471 | A * | 1/1976 | White et al. ................. | 73/861.04 |
| 4,957,007 | A * | 9/1990 | Gray .......................... | 73/861.65 |
| 5,086,777 | A | 2/1992 | Hishii | |
| 5,230,245 | A * | 7/1993 | Kamiunten et al. ............ | 73/195 |
| 5,469,749 | A * | 11/1995 | Shimada et al. ............ | 73/861.47 |
| 5,551,300 | A * | 9/1996 | Vurek et al. ...................... | 73/706 |
| 5,852,244 | A * | 12/1998 | Englund et al. .................. | 73/706 |
| 6,550,338 | B1 * | 4/2003 | Rashidi ............................ | 73/715 |
| 6,591,674 | B2 * | 7/2003 | Gehman et al. ............. | 73/204.22 |
| 6,622,564 | B2 * | 9/2003 | Imai ................................. | 73/715 |
| 6,691,579 | B2 * | 2/2004 | Orr et al. ......................... | 73/700 |
| 6,725,731 | B2 * | 4/2004 | Wiklund et al. ........... | 73/861.52 |
| 6,915,707 | B2 * | 7/2005 | Nyfors et al. .............. | 73/861.63 |
| 6,948,373 | B2 * | 9/2005 | Imai ................................. | 73/715 |
| 7,100,454 | B2 * | 9/2006 | Hasunuma ....................... | 73/715 |
| 7,278,326 | B2 | 10/2007 | Kobayashi et al. ...... | 73/862.041 |
| 7,353,719 | B2 | 4/2008 | Hiura et al. .............. | 73/862.046 |
| 7,430,918 | B2 | 10/2008 | Selvan et al. .................... | 73/721 |
| 7,726,876 | B2 * | 6/2010 | Laverdiere et al. ........... | 374/125 |
| 2007/0176121 | A1 | 8/2007 | Lyons et al. ................ | 250/492.1 |
| 2008/1012774 | | 6/2008 | Selvan et al. .................... | 73/727 |

FOREIGN PATENT DOCUMENTS

| | | |
|---|---|---|
| WO | 2007095597 | 8/2007 |
| WO | WO 2008/070603 A2 | 6/2008 |
| WO | WO 2008/070603 A3 | 6/2008 |

* cited by examiner

*Primary Examiner* — Lisa Caputo
*Assistant Examiner* — Jermaine Jenkins
(74) *Attorney, Agent, or Firm* — Seager Tufte & Wickhem LLC

(57) ABSTRACT

A flow-through pressure sensor apparatus that reduces the dead space of a flow tube utilized to provide fluid communication between a pressure sense die and a fluid and with an absolute minimum trapped volume. A cover (e.g., plastic) with two-molded ports can be added to one side of the pressure sense die utilizing molded-in solder pins to improve ruggedness and rigidity. A temperature and a humidity sensor can also be mounted to a substrate (e.g., ceramic) in the flow path and can be connected to a programmable compensation integrated circuit on the opposite side utilizing a clip end of mounting pins or by vias through the substrate outside a pressurized area.

21 Claims, 6 Drawing Sheets

FLOW-THROUGH PRESSURE SENSOR APPARATUS

TECHNICAL FIELD

Embodiments are generally related to sensing devices and methods such as, for example, flow sensors, pressure sensors, humidity sensors, and temperature sensors. Embodiments are also related to flow-through pressure sensors.

BACKGROUND OF THE INVENTION

A number of processes and devices have been implemented to measure flow rate in different applications. Flow-through pressure sensors can be utilized in conjunction with an in-line orifice to measure very low flow rates and with reliable accuracy. Such pressure sensors have been utilized, for example, in various flow sensing devices such as medical applications, some of which utilize silicon piezoresistive sensing technology for measuring very low pressures. Other flow sensing implementations, for example, include environmental applications.

The majority of flow-through pressure sensor configurations require some type of conduit so that a pressure-sensitive component can be disposed in fluid communication with a fluid whose pressure is to be detected. The conduit can be connected to the pressure sensor utilizing a T-fitting or similar connection. Such pressure connection configurations available on most pressure sensors are 'dead-ended'. Dead spaces affect the cleanliness of the device because any dead spaces in the conduit can trap a portion of the fluid and collect contaminants. When measuring the pressure of the fluid flowing in the conduit, dead volumes may also interfere with the smooth, laminar flow of the fluid. In high-speed dynamic applications, such tubing and fittings can limit the frequency response of the device.

Furthermore, in order to maintain extreme purity of the fluids, it has heretofore been necessary to dismantle the conduit and/or transducer manually and then clean all of the regions accessible to the fluids, which is costly and time consuming. Also, such connecting plumbing makes the measurement of a temperature of the media, or the humidity, or other characteristic of the media difficult or impossible. Such sensors have a comparatively large surface area exposed to the fluid, which can trap contaminants. It is also advantageous for a pressure sensor to be of small size. Typically, the smaller the size, the easier it is for the sensor to fit into a constricted operating environment and attach to a wide variety of sizes and shapes of conduits and containers.

Based on the foregoing, it is believed that a need exists for an improved flow-through pressure sensor apparatus with the foregoing advantages that possess a highly compact point of attachment to the conduit. A need also exits to provide a sensor with a good dynamic response.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved sensor methods and systems.

It is another aspect of the present invention to provide for an improved flow-through pressure sensor apparatus.

It is a further aspect of the present invention to provide for an improved flow-through pressure sensor apparatus with absolute minimum trapped volume.

The aforementioned aspects and other objectives and advantages can now be achieved as described herein. A flow-through pressure sensor apparatus that reduces the dead space of a flow tube utilized to provide fluid communication between a pressure sense die and a fluid with an absolute minimum trapped volume is disclosed. A cover (e.g., plastic) with two-molded ports can be added to one side of the pressure sense die utilizing molded-in solder pins to improve ruggedness and rigidity. The pressure sense die can be mounted to or located within a housing, depending upon design considerations. A temperature and a humidity sensor can also be mounted to a substrate (e.g., ceramic) in the flow path and can be connected to a programmable compensation integrated circuit on the opposite side utilizing a clip end of mounting pins or by vias through the substrate outside a pressurized area.

The pressure sense die can be mounted either on top or bottom of the substrate to minimize the chances of dust or similar contaminants becoming trapped in the apparatus. The covers can be molded so as to minimize disruption to the flow path and without hard edges that can trap contaminants. The sense die can be mounted with or without a glass constraint layer to minimize internal dead volumes. The temperature can be measured utilizing the sense die, an internal temperature sensor in the ASIC, or an external temperature sensor mounted directly in the flow path.

Such an apparatus can be easily adaptable to flow tubes of different sizes and can be connected with different connections, or with a molded-in connector. The sensor housing can be implemented as a single-in-package (SIP), dual-in-package (DIP), or a surface mount type (SMT), which is low cost and smaller in size. The sense die and the programmable compensation integrated circuit can be electrically connected together internally or externally of the package. Also, the flow tubes with 180 or 90-degree turns can also be easily embodied. Such an apparatus reduced the dead space and smaller in size hence the apparatus can be easily fit into a constricted operating environment and can be attached to a wide variety of sizes and shapes of flow tubes and containers.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
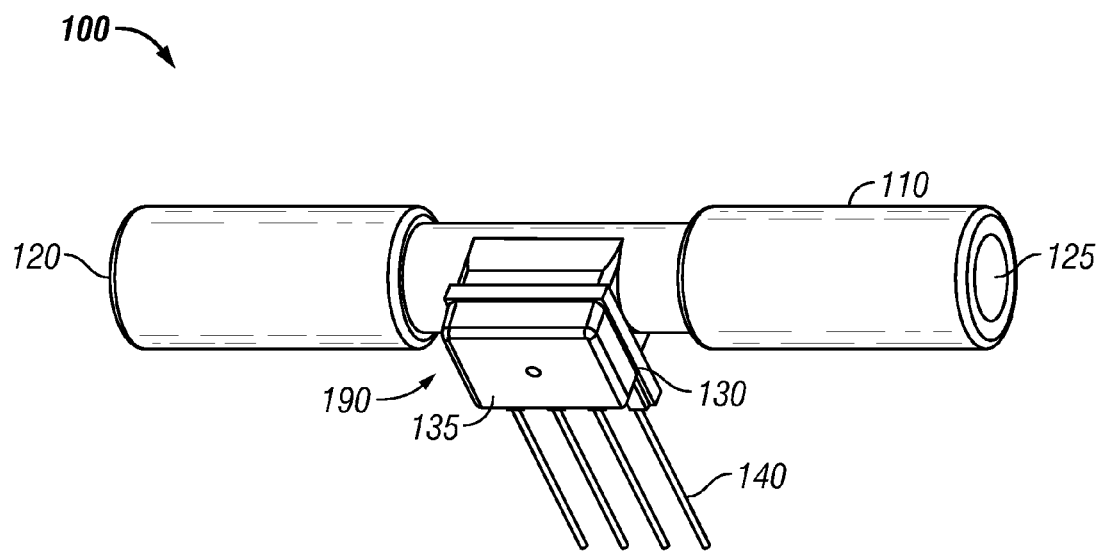
FIG. 1 illustrates a perspective view of a flow-through pressure sensor apparatus utilizing surface mount technology (SMT), which can be implemented in accordance with a preferred embodiment.
Figure 3:
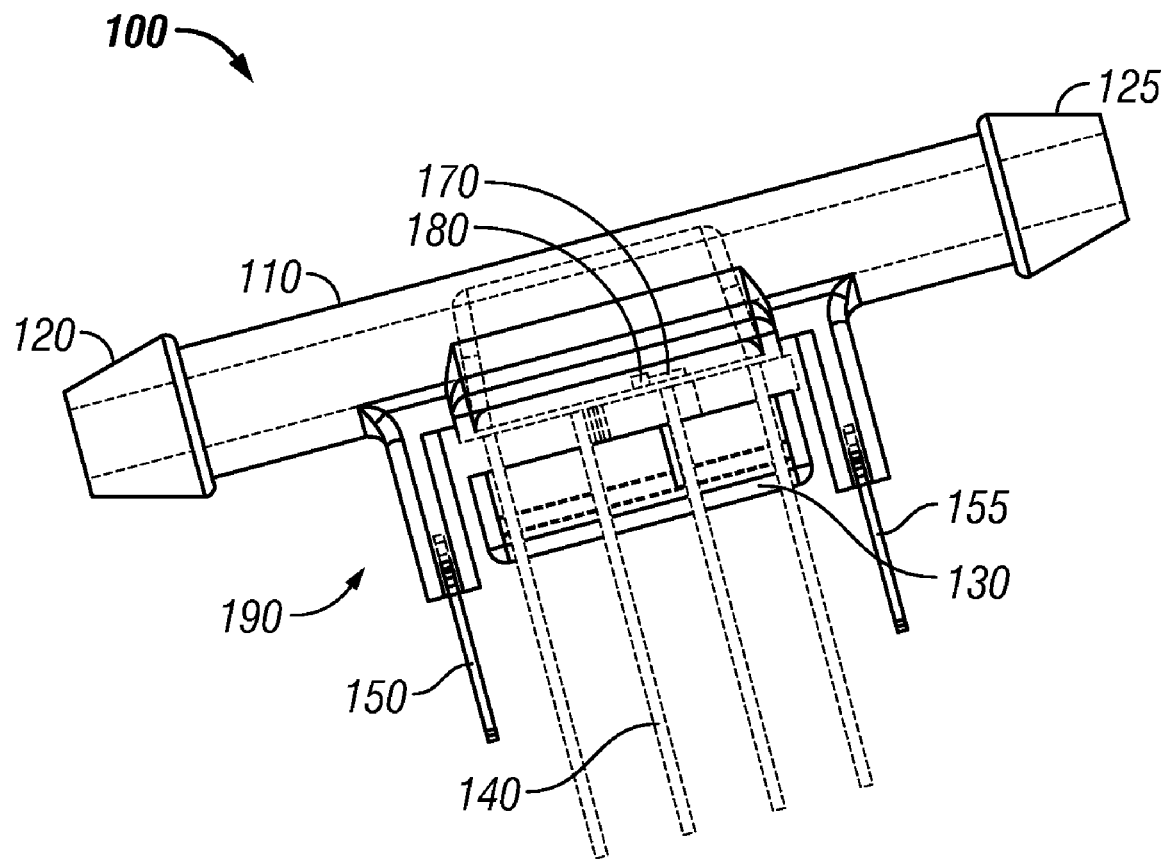
FIG. 3 illustrates a cross-sectional view of the flow-through pressure sensor apparatus utilizing surface mount technology, which can be implemented in accordance with a preferred embodiment.

FIG. 1 illustrates a perspective view of a flow-through pressure sensor apparatus 100 utilizing surface mount technology (SMT), which can be implemented in accordance with a preferred embodiment. The apparatus 100 generally includes a housing 190 and a flow tube 110 having an inlet port 120 and an outlet port 125. A pressure sense die 180 and a programmable compensation integrated circuit 170 can be located on a substrate 130 and packaged inside the surface mount technology package housing 190, as shown in FIG. 3. The material of the substrate 130 can be configured from material such as, for example, ceramic, alumina, or a fiberglass PC board material, such as FR4 or FR5, although other ceramics may be utilized to implement substrate 130. Ceramic materials having a lower temperature coefficient of expansion (TCE) which more closely matches the TCE of the silicon sense die 180 yield the best performance from the silicon sense die 180. Fiberglass boards, for example, can be utilized successfully at higher pressures, or where device performance is less critical.

A fluid flowing through the flow tube 110 applies a fluid pressure to the interior surface of the flow tube 110. Note that as utilized herein, the term "fluid" refers generally to a liquid or a gas (e.g., air). The term "media" can also be utilized to refer to a fluid, air, gas, liquid, etc. that flows through the flow tube 110. The fluid can be an ingredient in the processing of a pharmaceutical, foodstuff, or a fluid utilized in the manufacture of semi-conductor devices such as integrated circuits. The flow-through pressure sensor apparatus 100 possesses absolute minimum trapped volume with a small hole through the substrate 130 and a volume immediately behind the sense die 180. A cover 135 with the two-molded ports 120 and 125 can be added to one side of the pressure sense die 180 utilizing molded-in solder pins to improve ruggedness and rigidity.

Figure 2:
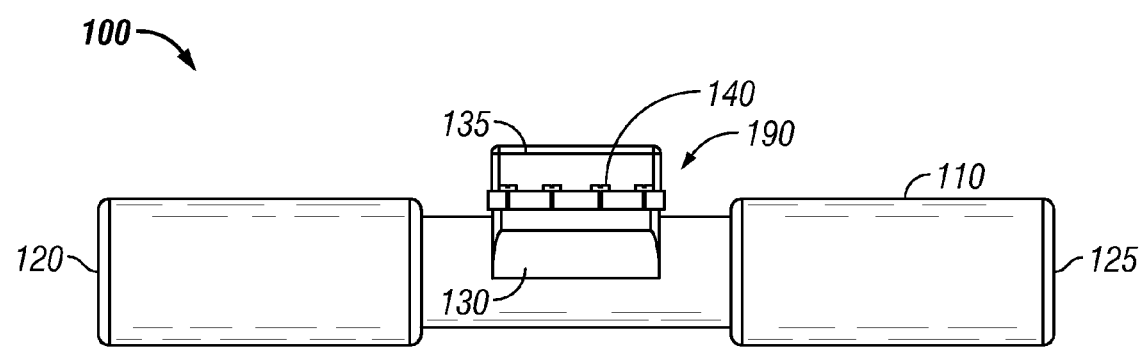
FIG. 2 illustrates a front view of the flow-through pressure sensor apparatus utilizing surface mount technology, which can be implemented in accordance with a preferred embodiment.

FIG. 2 illustrates a front view of the flow-through pressure sensor apparatus 100 utilizing SMT, which can be implemented in accordance with a preferred embodiment. Note that in FIGS. 1-9, identical, similar parts or elements are generally indicated by identical reference numerals. A humidity sensor (not shown) can be mounted to the substrate 130 in the flow path and the sense die 180 can be connected to the programmable compensation integrated circuit 170 on the opposite side utilizing a clip end of the mounting pins 150 and 155 or by vias through the substrate 130 outside the pressurized area. The sense die 180 can be mounted with or without a glass constraint layer (not shown) to minimize internal dead volumes. Note one type of device or system which may be utilized to implement programmable compensation integrated circuit 170 is, for example, an ASIC. It can be appreciated, of course, that other types of integrated circuit configurations may also be utilized to implement circuit 170.

FIG. 3 illustrates a cross-sectional view of the flow-through pressure sensor apparatus 100 utilizing SMT, which can be implemented in accordance with a preferred embodiment. The programmable compensation integrated circuit 170 can be generally placed on a lead frame 140 so that a temperature sensor in the programmable compensation integrated circuit 170 can be utilized for temperature compensation. The programmable compensation integrated circuit 170 placed on the lead frame 140 can be attached to the flow tube 110. The entire sensor apparatus 100 can be heat-sealed or joined by any other plastic joining process. The programmable compensation integrated circuit 170 incorporated in the sensor apparatus 100 brings about signal amplification. Note that housing 190 may be formed from a material such as plastic. Similarly, depending upon design considerations, the lead-frame 140 may be provided as a plastic lead-frame. Additionally, the flow channel permits the pressure sensor apparatus 100 to come into contact with fluid flow-through flow tube 110. The temperature can be measured utilizing the sense die 180, the temperature sensor, or an external temperature sensor mounted directly in the flow path.

Figure 4:
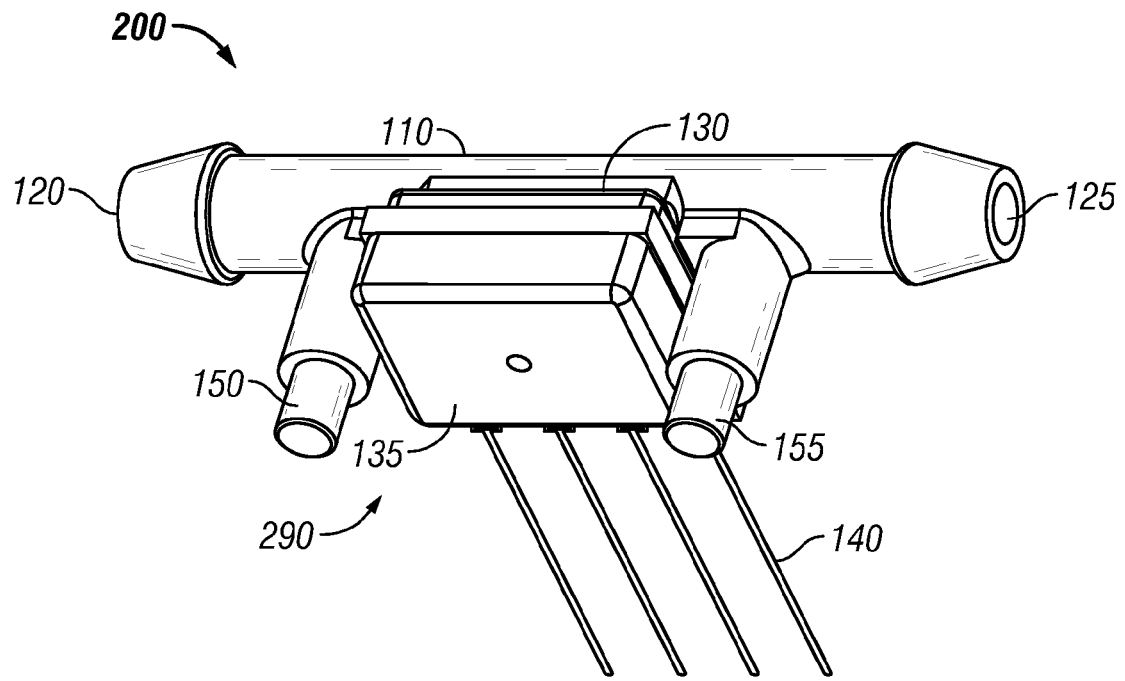
FIG. 4 illustrates a perspective view of a flow-through pressure sensor apparatus utilizing a standard single-in-line (SIP) package configuration, which can be implemented in accordance with a preferred embodiment.

FIG. 4 illustrates a perspective view of a flow-through pressure sensor apparatus 200 utilizing a standard single-in-line (SIP) package configuration common in the semiconductor industry for mounting Integrated Circuit (IC) chips, which can be implemented in accordance with a preferred embodiment. In general, SIP is an electronic device or circuit package style that has a single row of generally flat leads protruding from one edge. The flat leads usually lie in the same plane. The SIP package may contain one or more electronic elements such as, for example, semiconductor devices or integrated circuits. The pressure to be measured is input to the pressure port 120 and variations in the electrical properties of the pressure sense die 180 can be measured at the lead pins 140 of the SIP package 290 in a manner well know to those skilled in the art. The silicon die 180 can be electrically connected to predetermined pins 140 of the SIP package housing 290. The cover 135 can be utilized to seal or (cover) the silicon die 180 after it is mounted into the SIP package housing 290 and connected to the lead pins 140.

Figure 5:
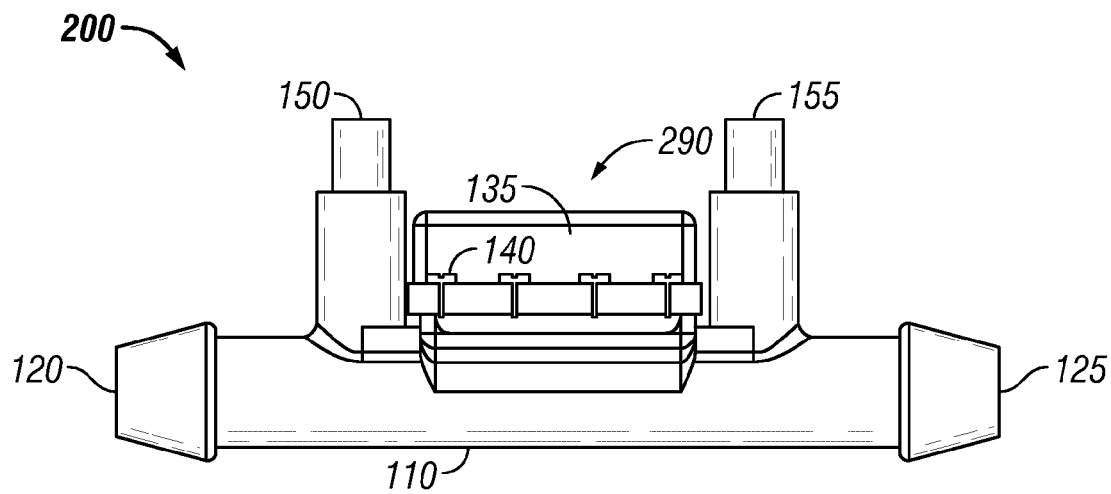
FIG. 5 illustrates a front view of the flow-through pressure sensor apparatus utilizing the standard single-in-line package configuration, which can be implemented in accordance with a preferred embodiment.

The attachment techniques of the silicon die 180 and the programmable compensation integrated circuit 170 on the package 290 can be either a clip end of the mounting pins 150 and 155 or by vias through the substrate 130 outside the pressurized area in accordance with standard IC practice well known to those skilled in the art. Specifically, the cover 135 with two molded ports 120 and 125 can be typically added to the side opposite from the sense die 180 thereby measuring a pressure applied between ports 120 and 125. It will be recognized by those skilled in the ad that various configurations and positioning of the ports may be included in the package to yield various configurations and various pressure measurements. FIG. 5 illustrates a front view of the flow-through pressure sensor apparatus 200 utilizing the standard SIP package configuration, which can be implemented in accordance with a preferred embodiment.

Figure 6:
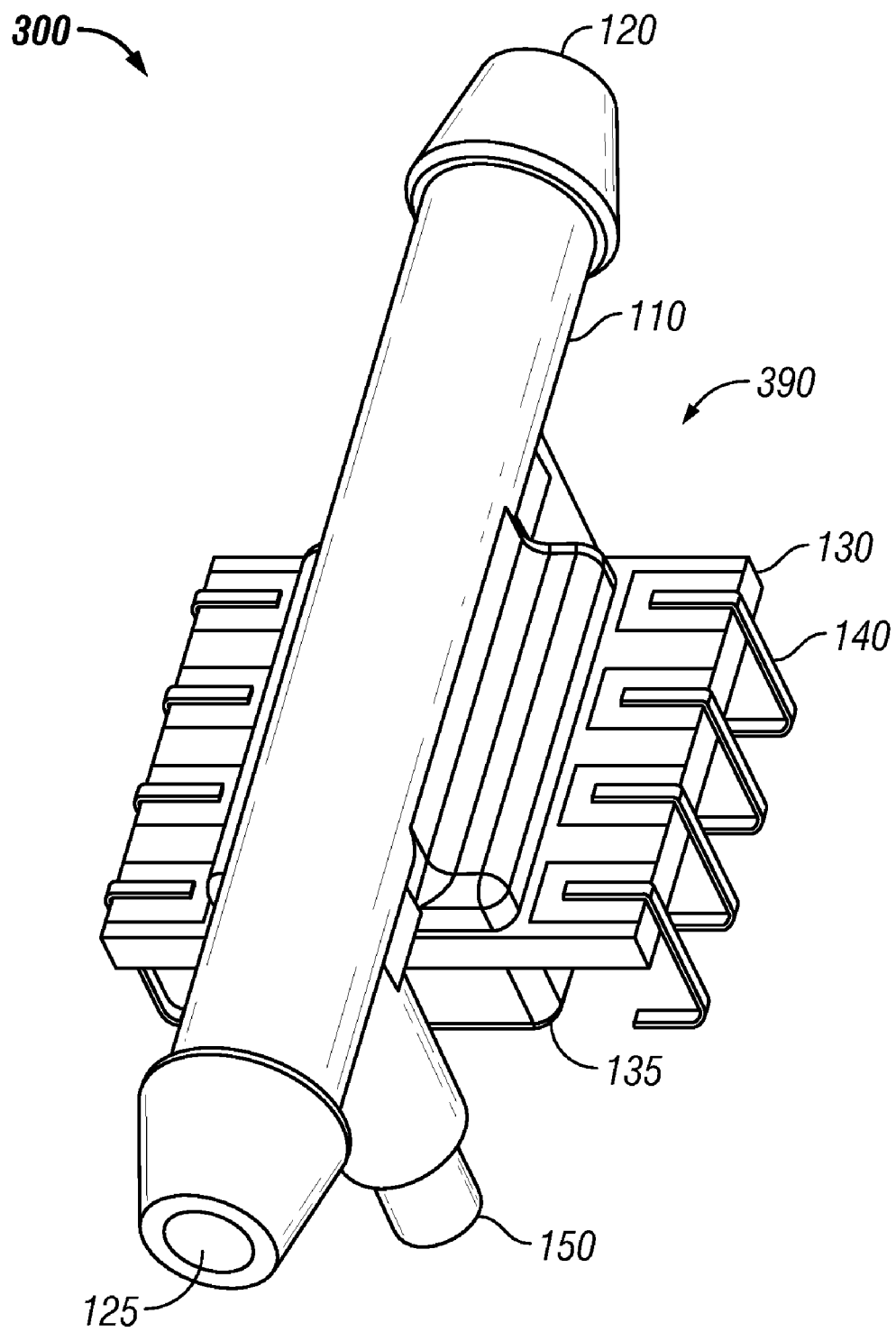
FIG. 6 illustrates a perspective view of a flow-through pressure sensor apparatus utilizing a standard dual-in-line (DIP) package configuration, which can be implemented in accordance with a preferred embodiment.

FIG. 6 illustrates a perspective view of a flow-through pressure sensor apparatus 300 utilizing a standard dual-inline (DIP) package configuration common in the semiconductor industry for mounting IC chips, which can be implemented in accordance with a preferred embodiment. The DIP is an electronic device package that can be configured with a rectangular housing such as housing 390 and two parallel rows of electrical connecting pins, usually protruding from the longer sides of the package and bent downward which is generally known as the lead frame 140. The DIP housing 390 includes the sense die 180 and the signal amplifier which can be provided via the functionality of the programmable compensation integrated circuit 170. Note that the programmable compensation integrated circuit 170 can also be utilized for signal-conditioning the flow-through pressure sensor apparatus 300.

Figure 7:
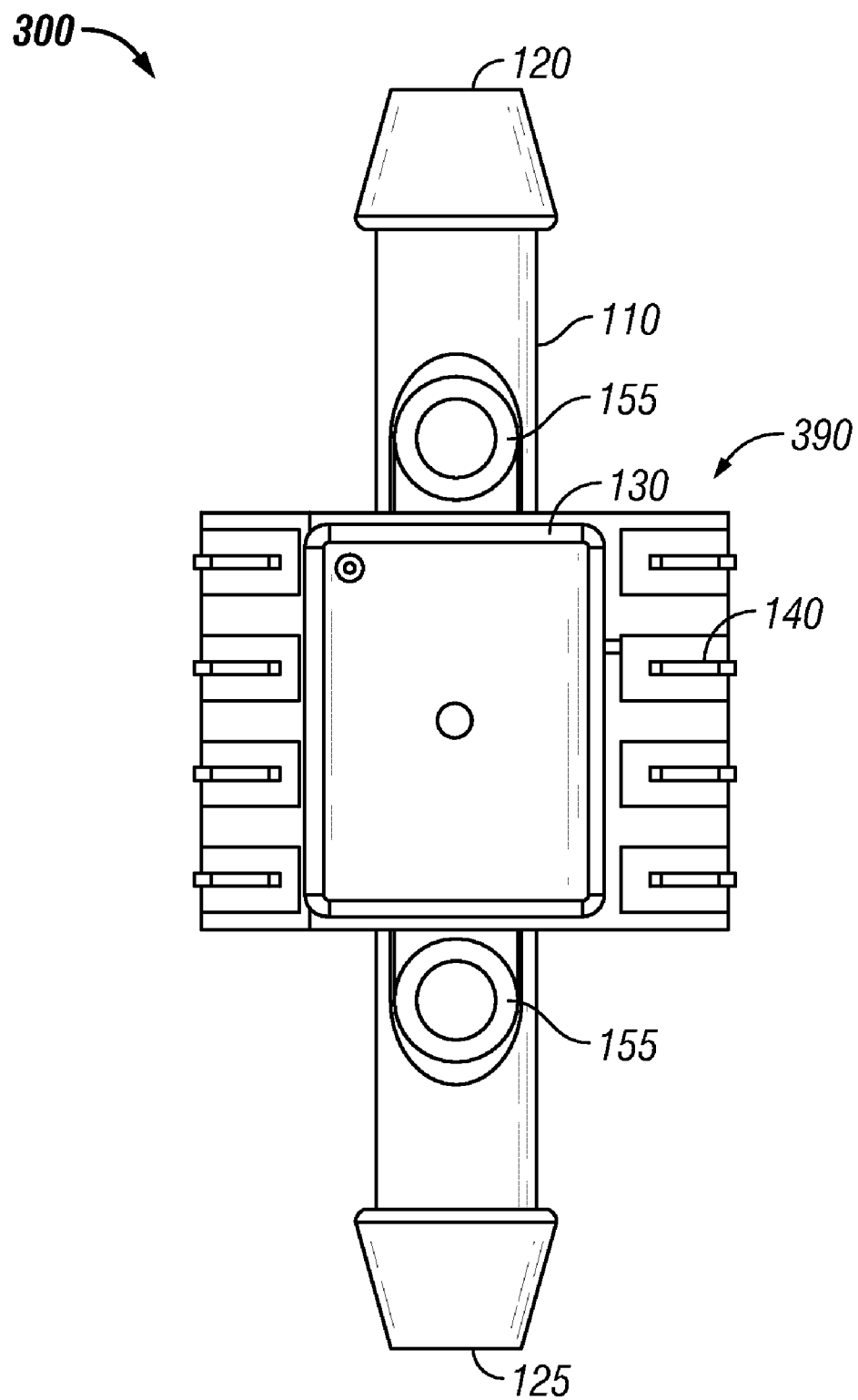
FIG. 7 illustrates a front view of the flow-through pressure sensor apparatus utilizing the standard dual-in-line package configuration, which can be implemented in accordance with a preferred embodiment.

A programmable compensation integrated circuit is useful because a typical output signal for a pressure sensor depends on temperature. One example of a programmable compensation integrated circuit device that may be utilized to implement signal-conditioning programmable compensation integrated circuit 170 is the differential sensor signal conditioner ZMD31050, supplied by ZMD America, Inc. Sensor ICs Business Unit 201 Old Country Road, Suite 204 Melville, N.Y. 11747 U.S.A. It can be appreciated that other types of programmable compensation integrated circuit devices may also be utilized to implement signal-conditioning programmable compensation integrated circuit 170, depending upon design considerations. FIG. 7 illustrates a front view of the flow-through pressure sensor apparatus 300 utilizing the standard DIP package configuration, which can be implemented in accordance with a preferred embodiment.

Figure 8:
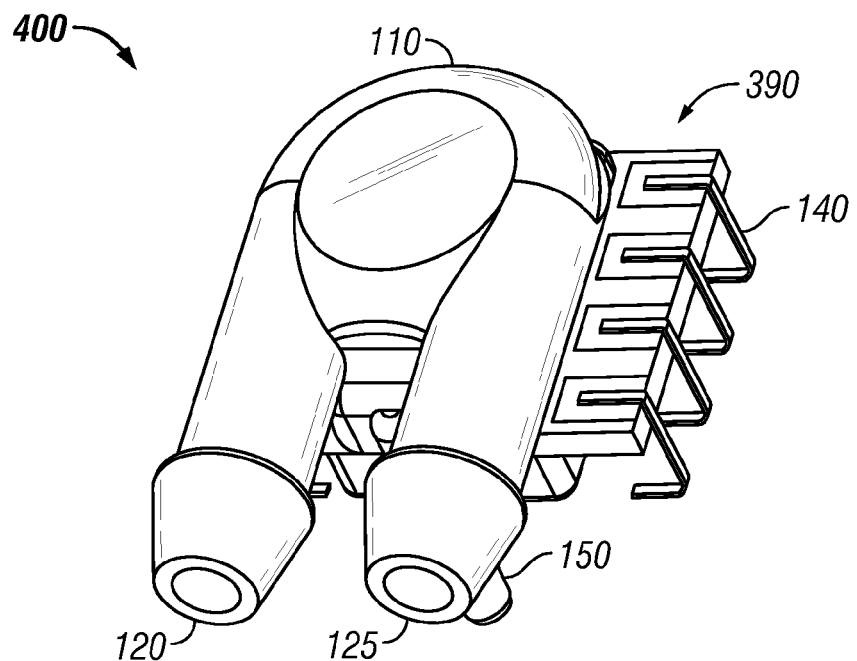
FIG. 8 illustrates a perspective view of a flow-through pressure sensor apparatus with a flow tube bent to 180°, which can be implemented in accordance with an alternative embodiment.
Figure 9:
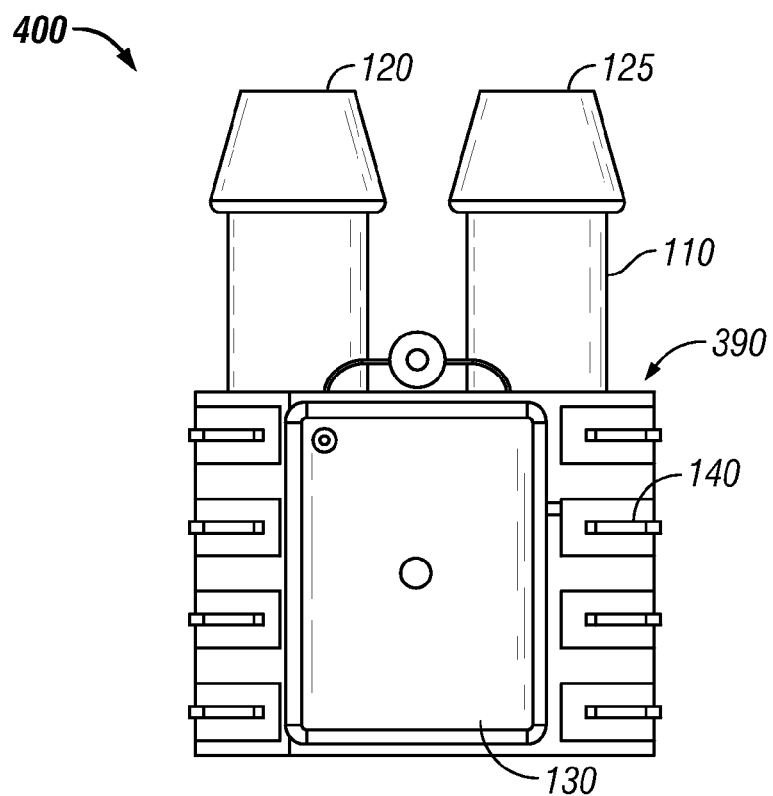
FIG. 9 illustrates a perspective view of the flow-through pressure sensor apparatus with the flow tube bent to 180°, in accordance with an alternative embodiment.

FIG. 8 illustrates a perspective view of a flow-through pressure sensor apparatus 400 with the flow tube 110 bent to, for example, 180°, which can be implemented in accordance with an alternative embodiment. Again, as a reminder in FIGS. 1-9, identical, similar parts or elements are generally indicated by identical reference numerals. The fluid flowing through the flow tube 110 exerts a fluid pressure on the interior surface of the flow tube 110. The lead frame 140 is generally planar in configuration and lies in a plane within the package housing 390 near a mid-plane thereof. FIG. 9 illustrates a perspective view of the flow-through pressure sensor apparatus 400 with the flow tube 110 bent to 180°, in accordance with an alternative embodiment.

The pressure sense die 180 can be mounted either on top or bottom of the apparatus 100, 200, 300 and 400 to minimize the chances of dust or similar contaminants becoming trapped in the apparatus. The cover 135 can be molded so as to minimize disruption to the flow path and without hard edges that would trap contaminants. Note that the apparatus 100, 200, 300 and 400 can be easily adaptable to flow tubes of different sizes and can be connected with different connections or with a molded-in connector. The flow-through pressure sensor apparatus 100, 200, 300 and 400 can be mounted in various directions to minimize the trapped volume. The flow-through pressure sensor apparatus disclosed herein possesses absolute minimum trapped volume with only a small hole through the housing 190, 290 and 390 and the volume immediately behind the sense die 180.

The apparatus 100, 200, 300 and 400 can be readily adapted to a variety of operational range of operation, has a comparatively low cost of construction, and can be readily assembled. Such devices also presents a low risk of damage to the electronics during assembly or operation, are accurate and reliable in operation, and can additionally be more readily cleaned than conventional devices. When utilized in the context of the preferred flow-through embodiment illustrated and described herein, the present invention also includes the extremely important advantage that it can provide all of the foregoing advantages while presenting no significant dead volumes within the sensor so that the sensor may be cleaned with a high degree of reliability without contaminating a subsequent fluid flow with material from a preceding fluid flow. Even in non-flow-through applications, certain of the foregoing advantages of the present invention make the present invention a competitive approach to pressure measurement. Various alterations and modifications will occur to those skilled in the art from the foregoing detailed description of the invention and the accompanying drawings.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A flow-through pressure sensor apparatus, comprising:
a housing;
a substrate having a first side and a second side and a hole extending through the substrate from the first side to the second side, where the first side of the substrate is mounted to the housing;
a pressure sense die mounted to the substrate, the pressure sense die positioned in the housing and extending generally along a die plane;
a cover mounted to the second side of the substrate; and
the housing defining a flow tube having a flow path extending between an inlet port and an outlet port, the flow tube extending substantially in a plane that is parallel to but offset from the die plane of the pressure sense die, the pressure sense die exposed to the flow path such that the pressure sense die can provide a measure related to the pressure of a fluid in the flow path.

2. The flow-through pressure sensor apparatus of claim 1, wherein the inlet port and the outlet port extend out in opposite directions.

3. The flow-through pressure sensor apparatus of claim 1, wherein the inlet port and the outlet port extend out at an angle of about 90 degrees relative to one another.

4. The flow-through pressure sensor apparatus of claim 1, wherein the inlet port and the outlet port extend out at an angle of about 180 degrees relative to one another.

5. The flow-through pressure sensor apparatus of claim 1, wherein the flow tube is molded as part of the housing.

6. The flow-through pressure sensor apparatus of claim 1, wherein the housing includes one or more mounting pins.

7. The flow-through pressure sensor apparatus of claim 1, wherein the housing implements a surface mount package configuration.

8. The flow-through pressure sensor apparatus of claim 1, wherein the housing implements a single-in-line (SIP) package configuration.

9. The flow-through pressure sensor apparatus of claim 1, wherein the housing implements a dual-in-line (DIP) package configuration.

10. The flow-through pressure sensor apparatus of claim 1, further comprising a signal conditioning circuit mounted to the substrate and electrically connected to the pressure sense die.

11. The flow-through pressure sensor apparatus of claim 10, wherein the signal conditioning circuit comprises a programmable compensation integrated circuit.

12. The flow-through pressure sensor apparatus of claim 1, further comprising one or more leads extending from the housing.

13. The flow-through pressure sensor apparatus of claim 1, further comprising a temperature sensor mounted in the housing and thermally coupled to the flow path such that the temperature sensor can provide a measure related to the temperature of the fluid in the flow path.

14. The flow-through pressure sensor apparatus of claim 1, further comprising a humidity sensor mounted in the housing and exposed to the flow path such that the humidity sensor can provide a measure related to the humidity of the fluid in the flow path.

15. The flow-through pressure sensor apparatus of claim 1, wherein the flow tube is configured from a plastic material.

16. The flow-through pressure sensor apparatus of claim 1, wherein the substrate comprises ceramic.

17. The flow-through pressure sensor apparatus of claim 1, wherein pressure sense die includes a glass constraint.

18. The flow-through pressure sensor apparatus of claim 1, wherein the substrate comprises fiberglass.

19. A flow-through pressure sensor apparatus, comprising:
a housing;
a substrate mounted to the housing;
a pressure sense die mounted to the substrate positioned in the housing;
a cover mounted to the substrate;
the housing defining a flow tube having a flow path extending between an inlet port and an outlet port, the pressure sense die exposed to the flow path such that the pressure sense die can provide a measure related to the pressure of a fluid in the flow path; and
one or more leads extending from the housing, the one or more leads conveying an electrical signal(s) that is related to the pressure of the fluid in the flow path sensed by the pressure sense die; and
wherein the substrate includes a hole extending therethrough and the pressure sense die is positioned over the hole extending through the substrate.

20. The flow-through pressure sensor apparatus of claim 19, wherein said flow tube includes smoothly contoured interior surfaces.

21. A method of forming a flow-through pressure sensor apparatus, comprising:
mounting a pressure sense die on a substrate and over a hole extending through the substrate;
mounting the pressure sense die in a housing, wherein the housing includes a flow tube that defines a flow path that extends between an inlet port and an outlet port, and wherein the pressure sense die is mounted to be exposed to the flow path of the flow tube;
mounting the housing to a first side of the substrate;
mounting a cover to the second side of the substrate; and
providing one or more leads that extend out from the housing, the one or more leads configured to convey an electrical signal(s) that is related to the pressure of the fluid in the flow path sensed by the pressure sense die.

\* \* \* \* \*